(12) United States Patent
Ito et al.

(10) Patent No.: US 10,012,254 B2
(45) Date of Patent: Jul. 3, 2018

(54) JOINING STRUCTURE

(71) Applicants: Japan Agency for Marine-Earth Science and Technology, Kanagawa (JP); TORAY INDUSTRIES, INC., Tokyo (JP)

(72) Inventors: Hisao Ito, Yokosuka (JP); Kazumasa Kato, Yokosuka (JP); Yutaka Ochi, Nagoya (JP); Naofumi Hosokawa, Nagoya (JP); Hirohisa Hagita, Shimada (JP); Shigekazu Kawauchi, Makinohara (JP)

(73) Assignees: Japan Agency for Marine-Earth Science and Technology, Kanagawa (JP); TORAY INDUSTRIES, INC., Tokyo (JP)

( * ) Notice: Subject to any disclaimer, the term of this patent is extended or adjusted under 35 U.S.C. 154(b) by 315 days.

(21) Appl. No.: 14/889,371

(22) PCT Filed: May 15, 2014

(86) PCT No.: PCT/JP2014/062942
§ 371 (c)(1),
(2) Date: Nov. 5, 2015

(87) PCT Pub. No.: WO2014/185488
PCT Pub. Date: Nov. 20, 2014

(65) Prior Publication Data
US 2016/0076569 A1   Mar. 17, 2016

(30) Foreign Application Priority Data
May 17, 2013   (JP) ................................. 2013-105070

(51) Int. Cl.
*F16B 7/02* (2006.01)
*B29C 65/56* (2006.01)
(Continued)

(52) U.S. Cl.
CPC .............. *F16B 7/02* (2013.01); *B29C 65/561* (2013.01); *B29C 65/562* (2013.01);
(Continued)

(58) Field of Classification Search
CPC .... F16B 7/02; F16B 7/025; F16B 7/18; F16B 7/22; F16G 11/042; F16G 11/048;
(Continued)

(56) References Cited

U.S. PATENT DOCUMENTS 3,374,511 A * 3/1968 Barker .................... F16G 11/04
403/369
3,660,887 A   5/1972 Davis
(Continued)

FOREIGN PATENT DOCUMENTS

EP   2837853 A1   2/2015
GB   1209891 A   10/1970
(Continued)

OTHER PUBLICATIONS

The extended European search report issued by the European Patent Office dated Dec. 23, 2016, which corresponds to European Patent Application No. 14797694.8-1706 and is related to U.S. Appl. No. 14/889,371.
(Continued)

*Primary Examiner* — Daniel J Wiley
(74) *Attorney, Agent, or Firm* — Studebaker & Brackett PC (57) ABSTRACT

A joint structure is a joint structure between a first member having a pillared end part made of a fiber-reinforced plastic and a second member different from the first member. The end part of the first member is reversely tapered in an axial direction, while a joining member is disposed along a reversely tapered form of the end part. The second member is provided in contact with an end face of the first member
(Continued)

and connected to the joining member. A plurality of fibers substantially extending in the axial direction of the end part of the first member are provided within the end part and disposed to form a larger angle with the axial direction of the end part of the first member as they are disposed to be closer to a surface constituting the reversely tapered form in a radial direction of the end part.

9 Claims, 9 Drawing Sheets

(51) Int. Cl.
| | | |
|---|---|---|
| B29C 65/00 | (2006.01) | |
| B29K 101/00 | (2006.01) | |
| B29K 105/12 | (2006.01) | |
| B29K 307/04 | (2006.01) | |
| B29L 23/00 | (2006.01) | |
| B29L 31/30 | (2006.01) | |
| B29L 31/00 | (2006.01) | |

(52) U.S. Cl.
CPC ........ *B29C 66/1142* (2013.01); *B29C 66/522* (2013.01); *B29C 66/524* (2013.01); *B29C 66/526* (2013.01); *B29C 66/534* (2013.01); *B29C 66/5344* (2013.01); *B29C 66/721* (2013.01); *B29C 66/72141* (2013.01); *B29C 66/742* (2013.01); *B29C 66/7212* (2013.01); *B29K 2101/00* (2013.01); *B29K 2105/12* (2013.01); *B29K 2307/04* (2013.01); *B29L 2023/22* (2013.01); *B29L 2031/3002* (2013.01); *B29L 2031/7532* (2013.01)

(58) Field of Classification Search
CPC ... B29C 66/561; B29C 66/562; B29C 66/524; B29C 66/526; B29C 66/534; B29C 66/5344; B29C 70/00; B29C 70/06; B29C 67/00; B29C 67/14
See application file for complete search history.

(56) References Cited

U.S. PATENT DOCUMENTS

| | | | | |
|---|---|---|---|---|
| 3,858,992 A * | 1/1975 | Eucker | ................. | F16G 11/048 174/79 |
| 3,960,459 A * | 6/1976 | Hering | ..................... | D07B 9/00 403/267 |
| 4,899,499 A * | 2/1990 | Hoekstra | ............... | E01F 13/028 403/78 |
| 5,015,023 A * | 5/1991 | Hall | ...................... | F16G 11/048 24/115 G |
| 5,369,849 A * | 12/1994 | De France | ........... | F16G 11/048 24/115 M |
| 5,594,977 A * | 1/1997 | McCallion | .......... | E04G 17/0707 24/115 M |
| 5,683,273 A * | 11/1997 | Garver | ................. | H01R 4/5025 174/84 R |
| 7,367,090 B2 * | 5/2008 | Huffman | ............... | F16G 11/048 24/122.3 |
| 7,543,360 B2 * | 6/2009 | Campbell | ............. | F16G 11/042 24/122.6 |
| 8,215,886 B2 * | 7/2012 | Campbell | ............... | F16G 11/05 411/383 |
| 8,286,309 B2 * | 10/2012 | Landry | ................. | F16G 11/048 24/122.6 |
| 8,607,881 B2 * | 12/2013 | Streater, Jr. | ............. | E21B 31/00 166/242.6 |
| 9,181,967 B2 * | 11/2015 | Lim | ........................ | E04C 5/165 |
| 2004/0097144 A1 * | 5/2004 | Campbell | ............. | F16G 11/042 439/894 |
| 2007/0006429 A1 * | 1/2007 | Huffman | ............... | F16G 11/048 24/136 R |
| 2007/0007405 A1 * | 1/2007 | Al-Mayah | ............... | E04C 5/085 248/200 |
| 2008/0282511 A1 | 11/2008 | Chou et al. | | |
| 2009/0205172 A1 * | 8/2009 | Campbell | ............. | F16G 11/042 24/129 R |

FOREIGN PATENT DOCUMENTS

| | | |
|---|---|---|
| JP | S50-003118 B1 | 1/1975 |
| JP | S55-159121 U | 11/1980 |
| JP | S60-038573 U | 3/1985 |
| JP | S62-132010 A | 6/1987 |
| JP | S64-087231 A | 3/1989 |
| JP | H06-170958 A | 6/1994 |
| JP | H11-350592 A | 12/1999 |

OTHER PUBLICATIONS

International Search Report of the International Searching Authority; PCT/JP2014/062942 dated Jul. 8, 2014.
Notification of Transmittal of Translation of the International Preliminary Report on Patentability and Translation of Written Opinion of the International Searching Authority; PCT/JP2014/062942 dated Nov. 26, 2015.
Taichi Fujii, et al.; "Fracture and Mechanics of Composite Material"; Jikkyo Shuppan Co., Ltd.; 1978; p. 89; Japan.

* cited by examiner

JOINING STRUCTURE

TECHNICAL FIELD

The present invention relates to a joint structure between a member made of a fiber-reinforced plastic and another member.

BACKGROUND ART

Since FRP (Fiber Reinforced Plastics) have conventionally been used as members constituting constructions and the like, joint structures for connecting cylindrical FRP and metals to each other have been proposed (see, for example, Patent Literature 1).

CITATION LIST

Patent Literature

Patent Literature 1: Japanese Patent Application Laid-Open No. H11-350592

SUMMARY OF INVENTION

Technical Problem

When a joint structure is constructed by using bolts and rivets as mentioned in Patent Literature 1, however, it is necessary to form holes in the FRP. Forming a hole in the FRP cuts fibers included in the FRP, thereby lowering the strength of the FRP. Loads concentrate due to the small fastening area, whereby the joint structure as a whole lowers its strength.

Joint structures by bonding, such as those attaching the FRP and a metal to each other by applying an adhesive to their joining surface, may also be considered. In such a structure, the dirt, moisture, and the like on the bonding surface affect the joint strength. The thickness of the adhesive also affects the joint strength. Temperature and the like may also change physical properties of the adhesive. As mentioned above, the joint structures by bonding have a problem that there are many elements which affect the joint strength and are hard to manage.

The present invention is made In view of the above-mentioned problem and an object of the present invention is to provide a joint structure which can easily achieve a sufficient joint strength in a joint structure between a fiber-reinforced plastic and another member.

Solution to Problem

For achieving the above-mentioned object, the joint structure in accordance with one embodiment of the present invention is a joint structure between a first member, made of a fiber-reinforced plastic, having a pillared end part and a second member different from the first member; the end part of the first member is reversely tapered in an axial direction; the joint structure comprises a joining member disposed along a reversely tapered form of the end part of the first member; the second member is provided in contact with an end face of the first member and connected to the joining member; a plurality of fibers substantially extending in the axial direction of the end part of the first member are provided within the end part; the plurality of fibers are disposed to form a larger angle with the axial direction of the end part of the first member as they are disposed to be closer to a surface constituting the reversely tapered form in a radial direction of the end part.

The joint structure in accordance with one embodiment of the present invention is one which joins a first member made of a fiber-reinforced plastic and a second member to each other by utilizing an inclination of a reversely tapered form of an end part of the first member and can endure a force which separates the first and second members from each other. For joining with the second member formed from a metal material or the like, it is only necessary for the first member formed from a fiber-reinforced plastic to have a reversely tapered end part, whereby the joint structure can be constructed while keeping the strength of the first member itself. Since the plurality of fibers included in the end part of the first member are disposed to form a larger angle with the axial direction of the end part as they are disposed to be closer to a surface constituting the reversely tapered form, the strength of the end part can be secured. That is, the joint structure in accordance with one embodiment of the present invention can easily achieve a sufficient joint strength in a joint structure between a fiber-reinforced plastic and another member.

The reversely tapered form may increase a radial size of an outer peripheral surface toward to the end face of the first member. This configuration can construct the first member securely and easily.

In the end part of the first member, the first member may have a portion with an outer diameter not larger than the outer diameter of the reversely tapered form in a part of circumferential direction at the reversely tapered part in the outer peripheral surface, the first member and the joining member mating each other. This configuration makes it possible to connect the joining member to the first member from the end face on the reversely tapered end part side of the first member.

In this case, the end part of the first member may be tubular, a reinforcement member for supporting an inner peripheral surface being provided within the tubular end part of the first member. This configuration can prevent the tubular end part of the first member from collapsing inward.

The end part of the first member may be tubular, the reversely tapered form reducing a radial size of an inner peripheral surface toward to the end face of the first member, the joining member being disposed within the end part of the first member. This configuration can construct a joint structure in which the tubular end part of the first member has a fixed outer diameter.

In this case, a reinforcement member wound circumferentially about the outer peripheral surface of the tubular end part of the first member may be provided. This configuration can further enhance the joint strength.

The angle formed by the reversely tapered end part with the axial direction of the first member may be any of 3° to 5°. This configuration enables the reversely tapered end part of the first member to yield a greater joint strength between the first and second members.

The first member may be made of a carbon-fiber-reinforced plastic. The second member may be made of a metal.

Advantageous Effects of Invention

One embodiment of the present invention can easily achieve a sufficient joint strength in a joint structure between a fiber-reinforced plastic and another member.

DESCRIPTION OF EMBODIMENTS

In the following, embodiments of the joint structure in accordance with the present invention will be explained in detail with reference to the drawings. In the explanation of drawings, the same constituents will be referred to with the same signs while omitting their overlapping descriptions. Ratios of dimensions in the drawings do not always coincide with those explained.

Figure 1:
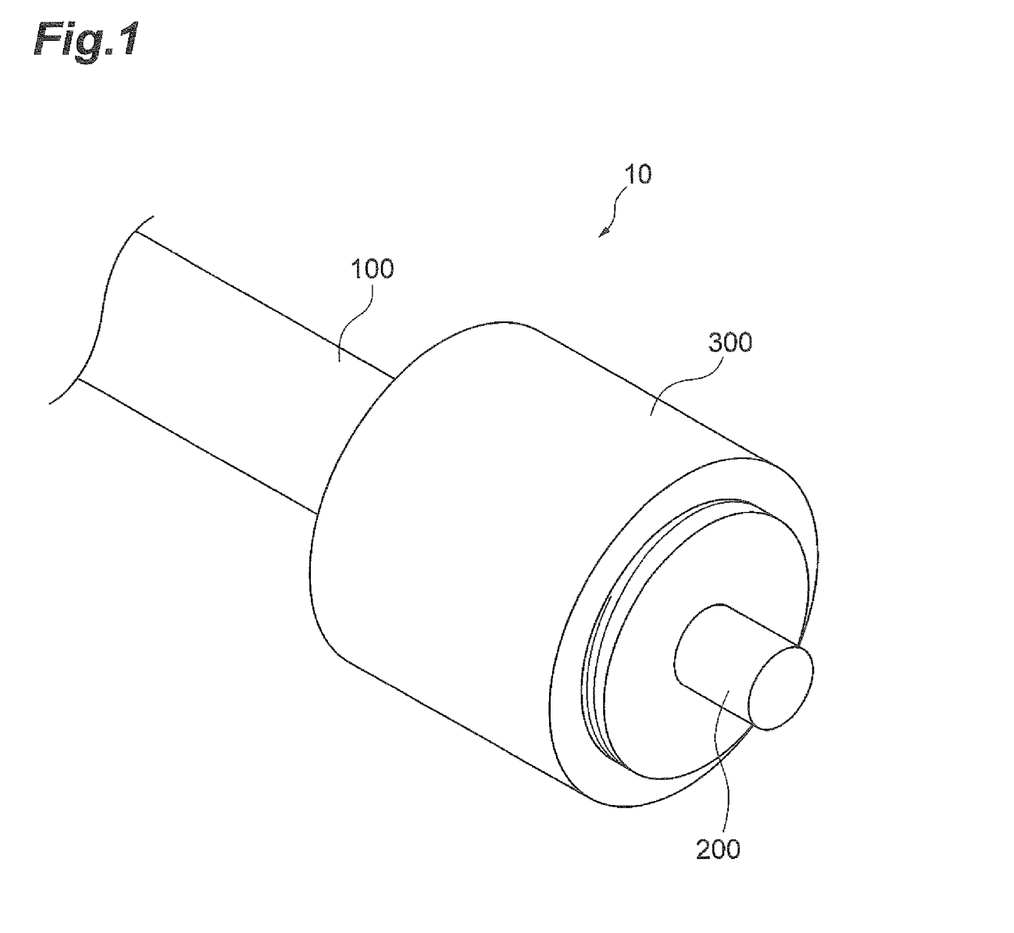
FIG. 1 is a perspective view of a joint structure in accordance with an embodiment of the present invention.

FIG. 1 is a perspective view of a joint structure 10 in accordance with an embodiment. The joint structure 10 is a structure which joins a first member 100 having a pillared end part and a second member 200, constructed separately from the first member, to each other. In this embodiment, by pillared is meant to include forms such as tubular forms which have an outer peripheral surface and become similar to a pillared form in a side face. The joint structure 10 includes a joining member 300 for joining the first member 100 and the second member 200 to each other. The first member 100 is a member constituted by FRP. The joint structure 10 in accordance with this embodiment is one for joining the first member 100 constituted by the FRP to another member in order for the former member to be used as a member constituting a construction.

As the FRP constituting the first member 100, CRFP (Carbon Fiber Reinforced Plastics) are used, for example. Other examples for use include GRFP (Glass Fiber Reinforced Plastics) and AFRP (Aramid Fiber Reinforced Plastics). In an end part 100a of the first member 100, fibers may be oriented in two directions, i.e., axial and circumferential directions thereof. This can enhance the strength of the first member 100 and joint structure 10.

Figure 2:
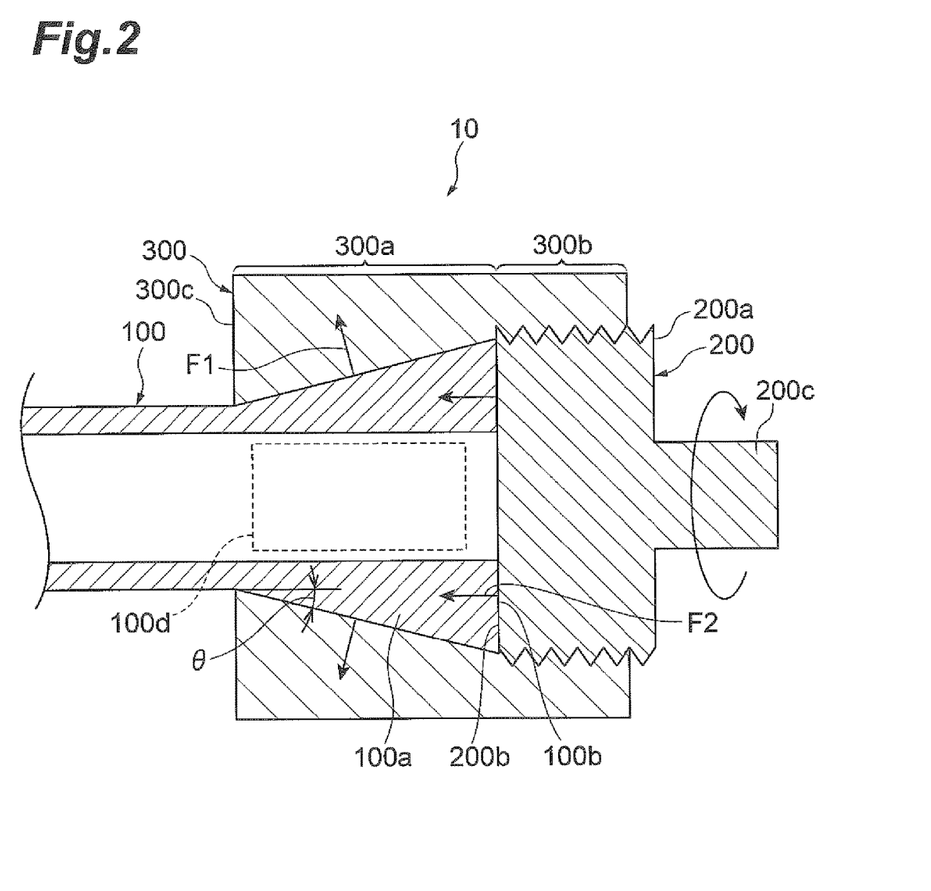
FIG. 2 is a sectional view of the joint structure in accordance with the embodiment of the present invention.

As illustrated in FIGS. 1 and 2, the end part 100a of the first member 100 has a cylindrical form (FRP pipe). The end part 100a of the first member 100 is also reversely tapered in the axial direction. Specifically, the end part 100a of the first member 100 is formed to increase the radial size of the outer peripheral surface (outer diameter) toward to an end face 100b of the first member 100 in the axial direction. This reversely tapered form is for securing the second member to the end part 100a of the first member 100 as will be explained later. The reversely tapered end part 100a of the first member 100 is a fixed length part in the axial direction from the end face 100b. The reversely tapered form of the end part 100a has a taper angle (angle with the axial direction of the end face 100a) θ which may be any of 3° to 5°, e.g., 3°, in view of the strength of securing between the first member 100 and joining member 300. However, the above-mentioned angle is not always necessary as long as a strength corresponding to the intended use and the like can be ensured. On the other hand, the radial size of the inner peripheral surface (inner diameter) of the end part 100a of the first member 100 is fixed.

Figure 3:
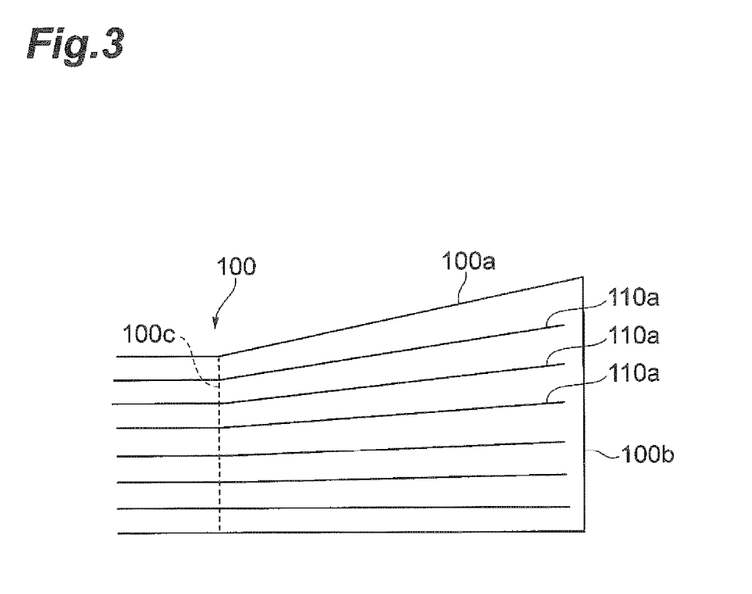
FIG. 3 is a diagram illustrating an arrangement of fibers in an end part of a first member.

FIG. 3 illustrates an arrangement of fibers extending in the axial direction of the first member 100 in the end part 100a of the first member 100. The fibers in the end part 100a of the first member 100 may be arranged as illustrated in FIG. 3, for example.

In this arrangement of fibers, a plurality of fibers 110a substantially extending in the axial direction of the first member 100 are disposed to form a larger angle with the axial direction of the first member 100 as they are disposed to be closer to an outside in a radial direction in the end part 100a of the first member 100. That is, the plurality of fibers 110a are disposed to form a larger angle with the axial direction of the end part 100a of the first member 100 as they are disposed to be closer to a surface constituting the reversely tapered form in a radial direction of the end part 100a. The axially disposed fibers 110a bend in directions similar to the reversely tapered form at a boundary 100c with the reversely tapered part in the axial direction. The fibers 110a increase the angle so as to approach the taper angle of the end part 100a as they are disposed to be closer to an outside in a radial direction. Thus arranging the fibers 110a can secure such a strength of the first member 100 as to be sufficient for constituting the joint structure 10. This is because those disposed on the inner side in the radial direction have smaller bending angles and can secure higher strength. Details will be explained later.

The second member 200 to be joined to the first member 100 has a junction 200a which is a part to join with the first member 100. The junction 200a has a circular pillared form with an outer diameter comparable in size to that of the end face 100b of the first member 100. The junction 200a has one end face 200b in contact with the end face 100b of the first member 100. The second member 200 has a second member body 200c formed integrally with the junction 200a on the other end face side of the junction 200a. The second member body 200c has a circular pillared form having an outer diameter smaller than that of the junction 200a, for example. The axis of the junction 200a and that of the second member body 200c are located on the same line. The second member body 200c is not directly related to the joint structure 10 and thus can take any form.

In the joint structure 10, the axis of the end part 100a of the first member 100 and that of the junction 200a of the second member 200 are located on the same line. A conventional fastening structure may be disposed separately on the second member 200 side (e.g., in the part of the second member body 200c) so that it can further be joined to another member.

The joining member 300 is a member which joins the first member 100 and the second member 200 to each other. The joining member 300 is a cylindrical member. The joining member 300 is disposed in close contact with and along the reversely tapered form of the outer peripheral surface of the end part 100a of the first member 100 and connected to the junction 200a of the second member 200. The diameter of the outer peripheral surface (outer diameter) of the joining member 300 is larger than that of the end part 100a of the first member 100 and that of the junction 200a of the second member 200, while being constant in the axial direction. The diameter of the inner peripheral surface (inner diameter) of the joining member 300 varies with axial position as will be explained in the following. In the axial direction, the joining member 300 is divided into a contact part 300a which comes into close contact with the end part 100a of the first member 100 and a connection part 300b which is connected to the junction 200a of the second member 200.

The axial length of the contact part 300a is the same as that of the reversely tapered part in the end part 100a of the first member 100. The inner periphery of the contact part 300a is formed along the reversely tapered form of the end part 100a of the first member 100. That is, the inner diameter of the end part on the connection part 300b side of the contact part 300a is the same in size as the outer diameter of the end face 100b of the first member 100. The inner diameter of the end part on the opening side of the contact part 300a (on the end face 300c side of the contact part 300a) is the same in size as the outer diameter of the part where the reversely tapered form of the end part 100a begins in the first member 100 (or the part not reversely tapered).

The inner peripheral surface of the connection part 300b of the joining member 300 and the outer peripheral surface of the junction 200a of the second member 200 are connected (secured) to each other by screwing. That is, the junction 200a of the second member 200 is screwed into the inner peripheral surface (hole) of the connection part 300b of the joining member 300, so as to be secured. Therefore, the inner peripheral surface of the connection part 300b is provided with a screw groove, while the size of the diameter of the inner peripheral surface (inner diameter) corresponds to the size of the diameter of the outer peripheral surface (outer diameter) of the junction 200a of the second member 200. The outer peripheral surface of the junction 200a of the second member 200 is also provided with a screw groove. The axial length of the connection part 300b is slightly shorter than that of the junction 200a.

As illustrated in FIGS. 1 and 2, the junction 200a slightly projects from the connection part 300b when the connection part 300b and junction 200a are screwed together so that the end face 200b of the junction 200a abuts against the end face 100b of the first member 100. In the joint structure 10, parts to be screwed and those to come into close contact with each other so as to be secured may be bonded with an adhesive or the like so as to attain higher connecting strength. The second member 200 and joining member 300 are formed (as metal pieces) from a metal, for example. They are formed from steel materials for mechanical structures, aluminum, and the like, for example.

Thus, the contact part 300a of the joining member 300 and the end part 100a of the first member 100 come into close contact with each other, while the connection part 300b of the joining member 300 and the junction 200a of the second member 200 are connected to each other such that the end face 200b of the junction 200a abuts against the end face 100b of the first member 100, whereby the end part 100a of the first member 100 and the junction 200a of the second member 200 are joined to each other. That is, the joint structure 10 in accordance with this embodiment joins the first member 100 and the second member 200 to each other by utilizing the inclination of the reversely tapered form of the end part 100a of the first member 100.

When such a force as to separate the first member 100 and the second member 200 from each other (a laterally pulling force in the sheet of FIG. 2) is applied therebetween, a force F1 from the outer peripheral surface of the end part 100a of the first member 100 acts on the contact part 300a of the joining member 300. The end part 100a of the first member 100 and the contact part 300a of the joining member 300 are in close contact with each other by the reversely tapered surface, so that no force is concentrated at one position, thus yielding a structure which can endure the separation force (tensile load).

When a compressing force (a force applied from a left or right end to the center in the sheet of FIG. 2) is exerted between the first member 100 and the second member 200, a force F2 from the junction 200a of the second member 200 acts on the end face 100b of the first member 100. However, the end face 100b of the first member 100 and the end face 200b on the junction 200a side of the second member 200 abut against each other and thus can endure the compression load.

Figure 4:
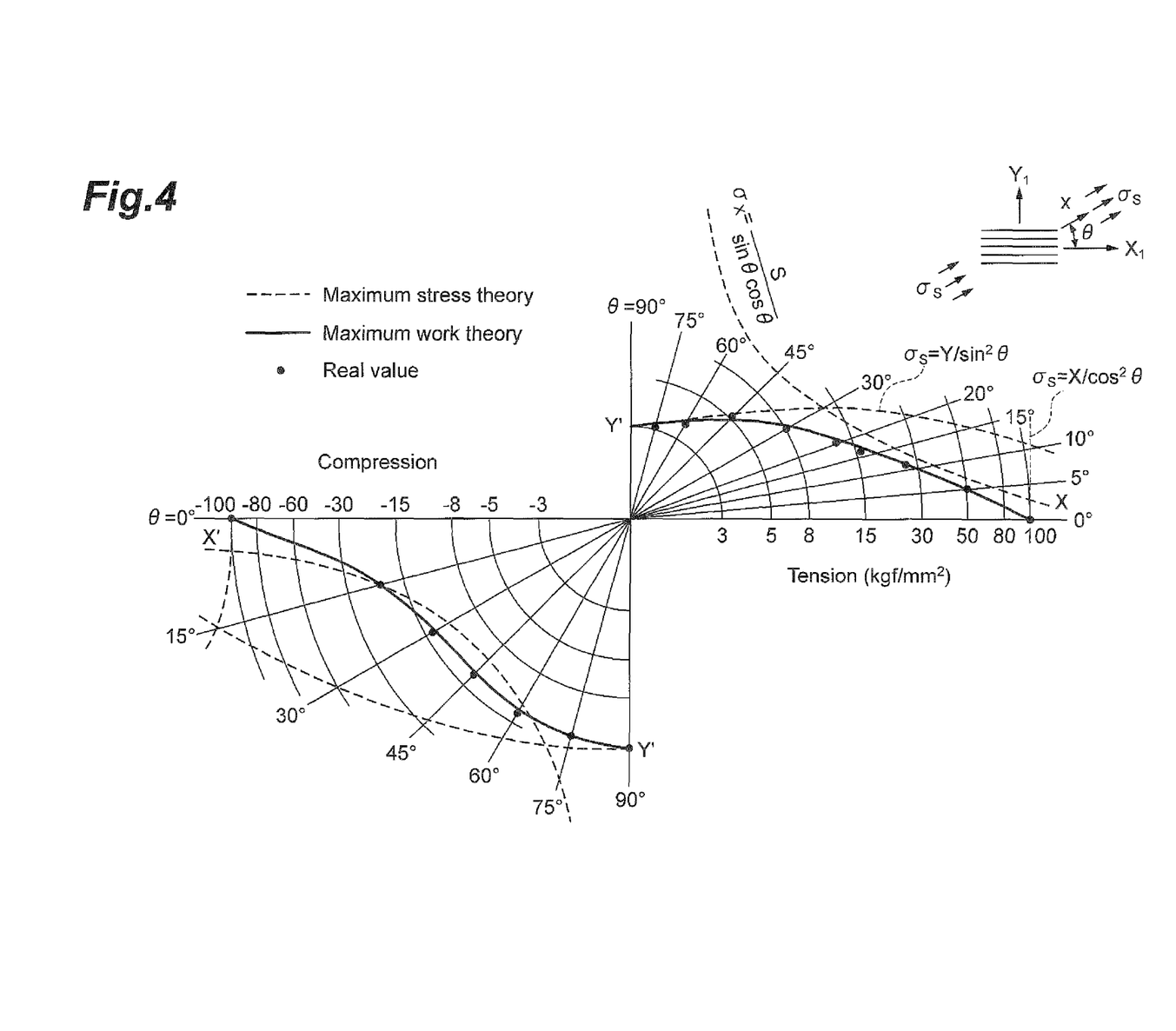
FIG. 4 is a graph illustrating a strength characteristic in a case where an obliquely tensile force is applied to a unidirectional fiber-reinforced plastic member.

FIG. 4 is a graph illustrating a strength characteristic in a case where an obliquely tensile force is applied to a unidirectional fiber-reinforced plastic member. This graph is one illustrated in FUJII Taichi and ZAKO Masaru, *Fracture and Mechanics of Composite Materials*, Jikkyo Shuppan, Co., Ltd., 1978, p. 89. Referring to the graph of maximum work theory matching well with real values therein, with respect to the tensile strength at an angle of 0°, the tensile strength is a half at an angle of 5° and about 70% at 3°. In view of this, the taper angle of the reversely tapered form of the end part 100a of the first member 100 may be on the order of 3° to 5° as mentioned above, while the reinforcement fibers arranged in the end part 100a of the first member 100 may have an inclination of 5° or less from the axial direction. Similarly, as for the compression, the compression strength is a half at the angle of 5° and about 70% at 3°.

For constructing the joint structure 10, it is only necessary for the first member 100 made of the FRP to shape the end part 100a into a reversely tapered form. It is therefore unnecessary for the first member 100 to have such a special form as to weaken its strength so as to join with the second member 200, whereby the joint structure 10 can be constructed while keeping the strength of the first member 100 itself.

Since a plurality of fibers included in the end part 100a of the first member 100 are disposed to form a larger angle with the axial direction of the end part 100a of the first member 100 as they are disposed to be closer to a surface constituting the reversely tapered form, the strength of the end part 100a can be secured. That is, the joint structure 10 in accordance with this embodiment can easily achieve a sufficient joint strength in the joint structure 10 between the first member 100 made of the FRP and another member 200, so as to be able to endure the above-mentioned compression load from the junction 200a, for example.

The connection part 300b of the joining member 300 and the junction 200a of the second member 200, which are secured to each other by screwing in the above-mentioned example, may be secured by pushing the junction 200a of the second member 200 into the connection part 300b of the joining member 300 by other methods. The second member 200 and joining member 300, which are constituted by a metal, may be constituted by other materials.

In the first member 100 illustrated in FIG. 2, a tubular inner region 100d of the end part 100a may be provided with a reinforcement (filler) for supporting the inner peripheral surface. This configuration may prevent the tubular end part 100a from collapsing circumferentially inward.

For example, a hole communicating with the inside of the first member 100 at the end face 200b may be provided within the second member 200. That is, the second member 200 may be tubular (pipe-like), so that a fluid flows within the first member 100 and the second member 200. In this case, a seal member such as an O-ring may seal the boundary between the first member 100 and joining member 300 and the boundary between the second member 200 and joining member 300 so that the fluid does not leak out of the first member 100 and the second member 200.

When the joining member 300 is constituted by one member in the above-mentioned configuration, it is necessary to connect the joining member 300 to the end part 100a of the first member 100 by inserting the first member 100 into the hole provided in the joining member 300 from the end part (left end part not depicted in FIG. 2) of the first member 100 on the side opposite from the end part 100a. However, for example, the joining member 300 may be cut into two by a cross section including the axis, and the cut members may be bonded (e.g., by mechanical connection or bonding with an adhesive) so as to cover the end part 100a of the first member 100 in the contact part 300a. This makes it unnecessary to insert the first member 100 into the hole provided in the joining member 300.

Figure 8:
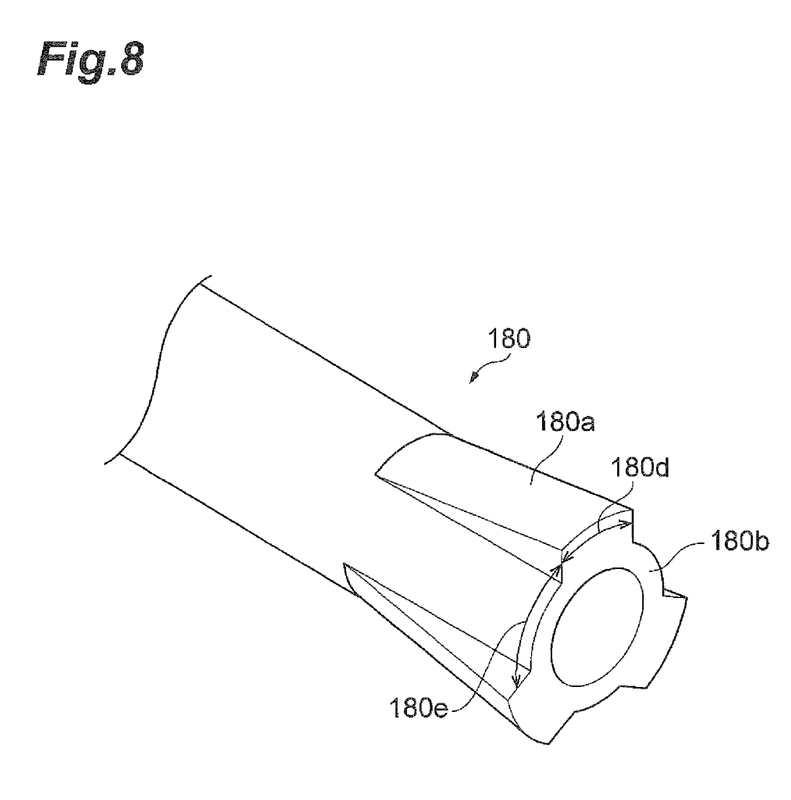
FIG. 8 is a perspective view of a modified example of the first member in accordance with the embodiment of the present invention.
Figure 9:
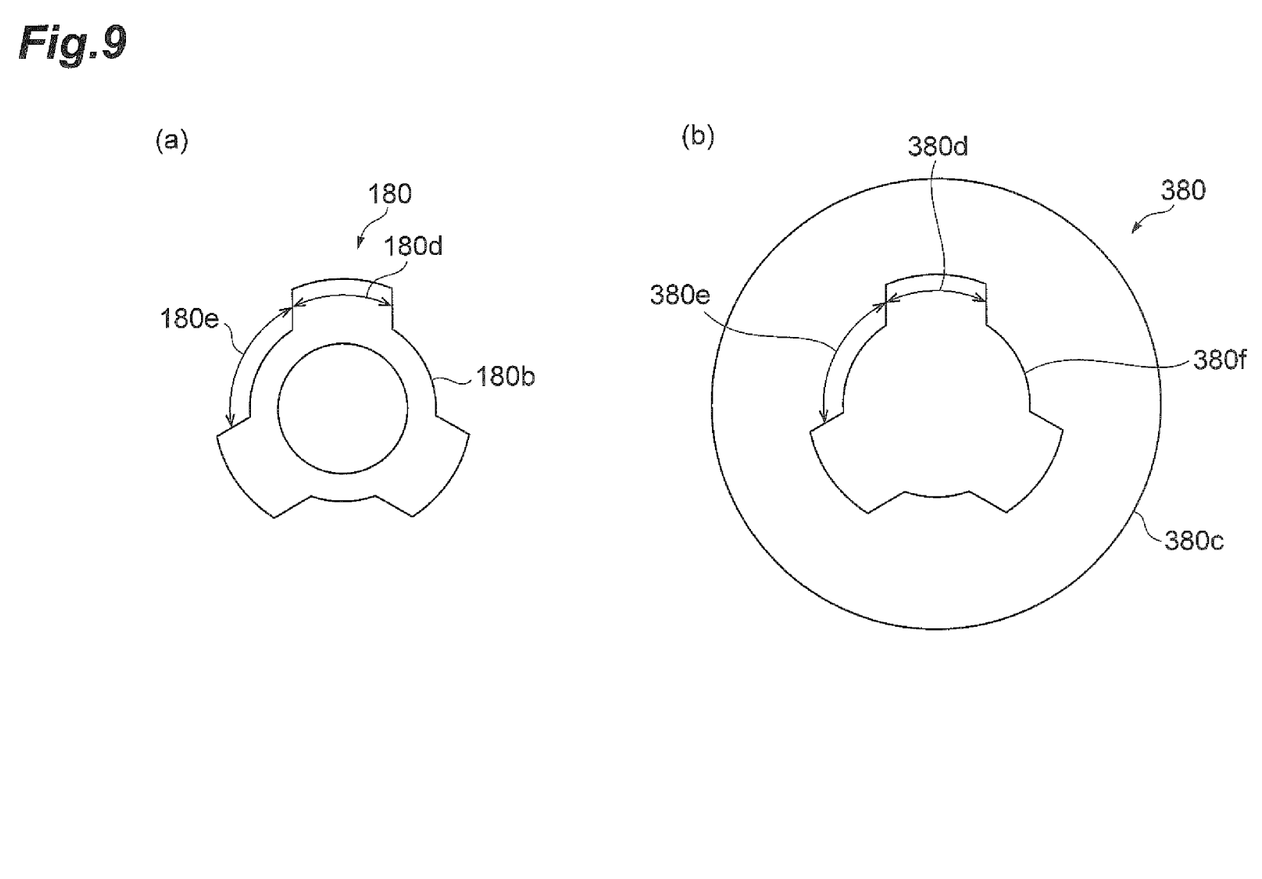
FIG. 9 is a diagram illustrating end faces of a modified example of the first member and joining member in accordance with the embodiment of the present invention.

As illustrated in FIGS. 8 and 9, a joining member 380 may be configured so as to be connectable to a first member 180 from an end face 180b on the side of a reversely tapered end part 180a of the first member 180. FIG. 8 is a perspective view of the first member 180. FIG. 9(a) illustrates the end face 180b on the reversely tapered end part 180a side of the first member 180, while FIG. 9(b) illustrates an end face 380c of the joining member 380 on the side of a contact part 380a coming into close contact with the first member 180.

As illustrated in FIGS. 8 and 9(a), the first member 180 is not reversely tapered throughout the circumferential direction of the outer peripheral surface of the end part 180a, but only in a part of the outer peripheral surface. That is, in the circumferential direction, the end part 180a of the first member 180 has portions 180d where its outer peripheral surface is reversely tapered and portions 180e where the outer peripheral surface is not reversely tapered. For example, three reversely tapered portions 180d are provided at equally-spaced intervals in the circumferential direction. The number by which the portions 180d are provided is not required to be 3 but may be 4, for example. Each of the portions 180e where the outer peripheral surface is not reversely tapered is interleaved between the reversely tapered portions 180d. These portions 180e have an outer diameter not larger than that of the reversely tapered form throughout the axial direction. More specifically, the outer diameter of these portions 180e is the same in size as that of the part where the reversely tapered form of the end part 180a begins in the first member 180 (or the part not reversely tapered on the inside of the end part 180a).

As illustrated in FIG. 9(b), the end face 380c of the joining member 380 is provided with an opening 380f having the same form as with the end face 100b of the first member 180. The end part 180a of the first member 180 is inserted into the opening 380f of the joining member 380. Therefore, the opening 380f may be made slightly larger than the form of the end face 180b of the first member 180 for easier insertion. The joining member 380 is provided with grooves oriented in the axial direction in the form of portions 380d corresponding to the reversely tapered portions 180d of the first member 180. The axial length of the grooves is the same as that of the reversely tapered form, In the joining member 380, portions 380e corresponding to the reversely untapered portions 180e in the first member 180 have a form similar to that of the contact part 300a in FIG. 2 mentioned above. That is, the inner periphery of the portions 380e oriented in the axial direction conforms to the reversely tapered form of the end part 180a of the first member 180.

The first member 180 and joining member 380 are configured as mentioned above and thus can take a structure (mating structure) in which they mate each other. Specifically, the end part 180a of the first member 180 is inserted into the joining member 380 from the opening 380f. The first member 180 is inserted into the joining member 380 by the axial length of the reversely tapered form and then is rotated circumferentially with respect to the joining member 380. This places the reversely tapered portions 180d of the first member 180 at the portions 380e where the inner periphery of the joining member 380 conforms to the reversely tapered form. That is, these portions 180d, 380e come into contact with each other as with those illustrated in FIG. 2.

The above-mentioned configuration can connect the joining member 380 to the first member 180 from the end face 180b of the first member 180 on the side of the reversely tapered end part 180a. The joining member 380 and first member 180 can easily be connected to each other in particular when the joining member 380 is hard to connect with the end part 180a of the first member 180 from the opposite side, e.g., when the first member 180 is axially very long.

Figure 5:
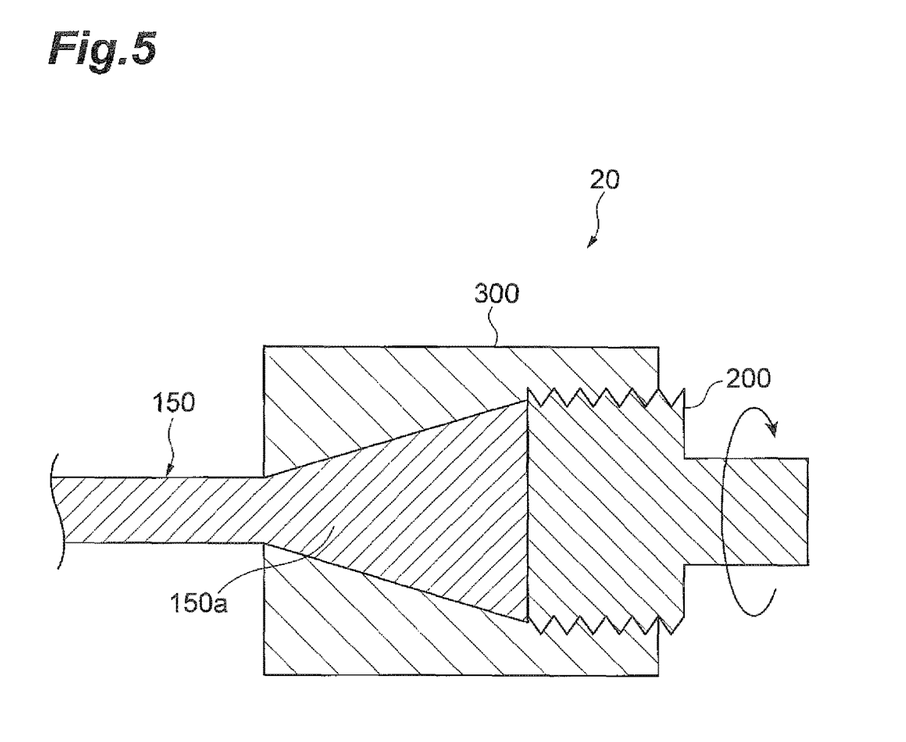
FIG. 5 is a sectional view of a modified example of the joint structure in accordance with the embodiment of the present invention.

The end part 100a in the first member 100 is tubular in the above-mentioned joint structure 10 but is not always required to be tubular. For example, as illustrated in the sectional view of FIG. 5, a circular pillared member having no hollow (hole) therewithin may be used as an end part 150a of a first member 150 for constituting a joint structure 20. As the second member 200 and joining member 300, those illustrated in FIGS. 1 and 2 may also be used in this case.

Figure 6:
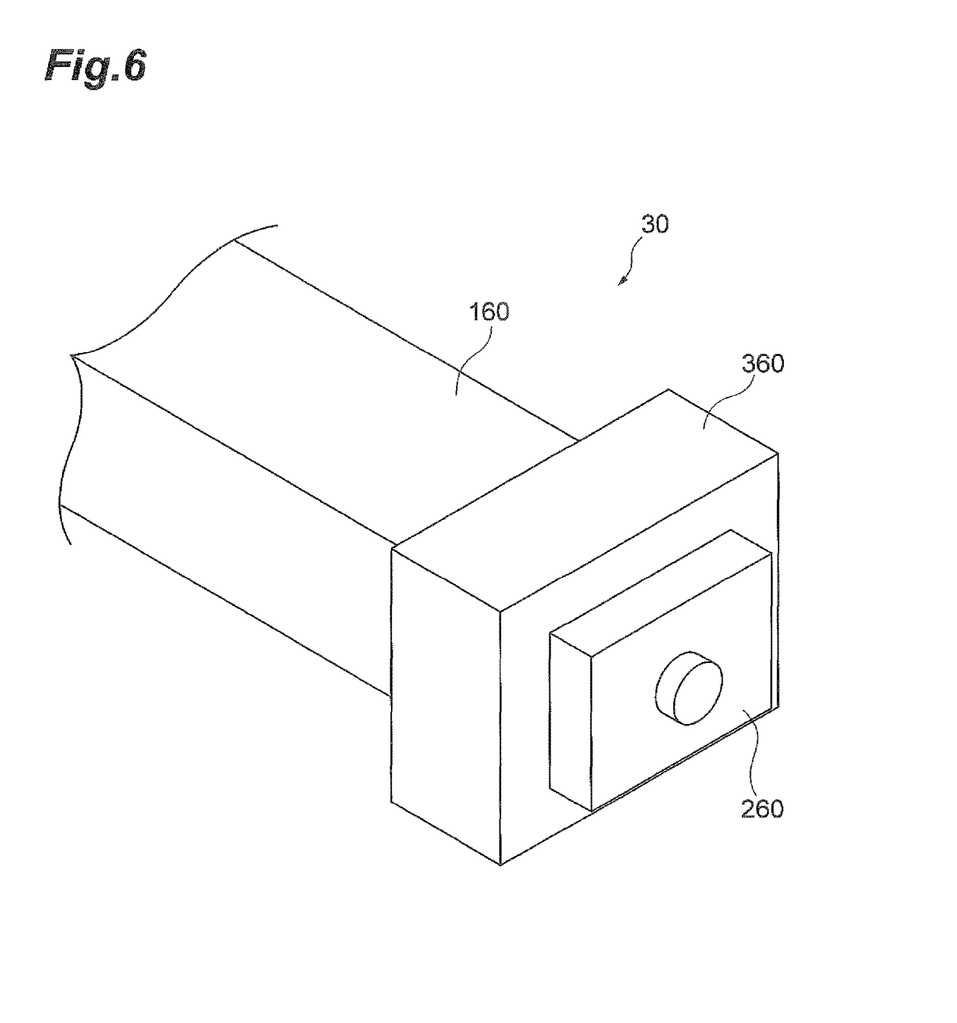
FIG. 6 is a perspective view of another example of the joint structure in accordance with the embodiment of the present invention.

While members having circular cross sections are used in the above-mentioned joint structures 10, 20, it is not always necessary to do so. For example, as illustrated in the perspective view of FIG. 6, a first member 160, a second member 260, and a joining member 360 each having a rectangular cross section may be used for constructing a joint structure 30. In this case, the second member 260 and joining member 360 cannot be connected by screwing and thus are connected to each other by any method other than screwing.

Figure 7:
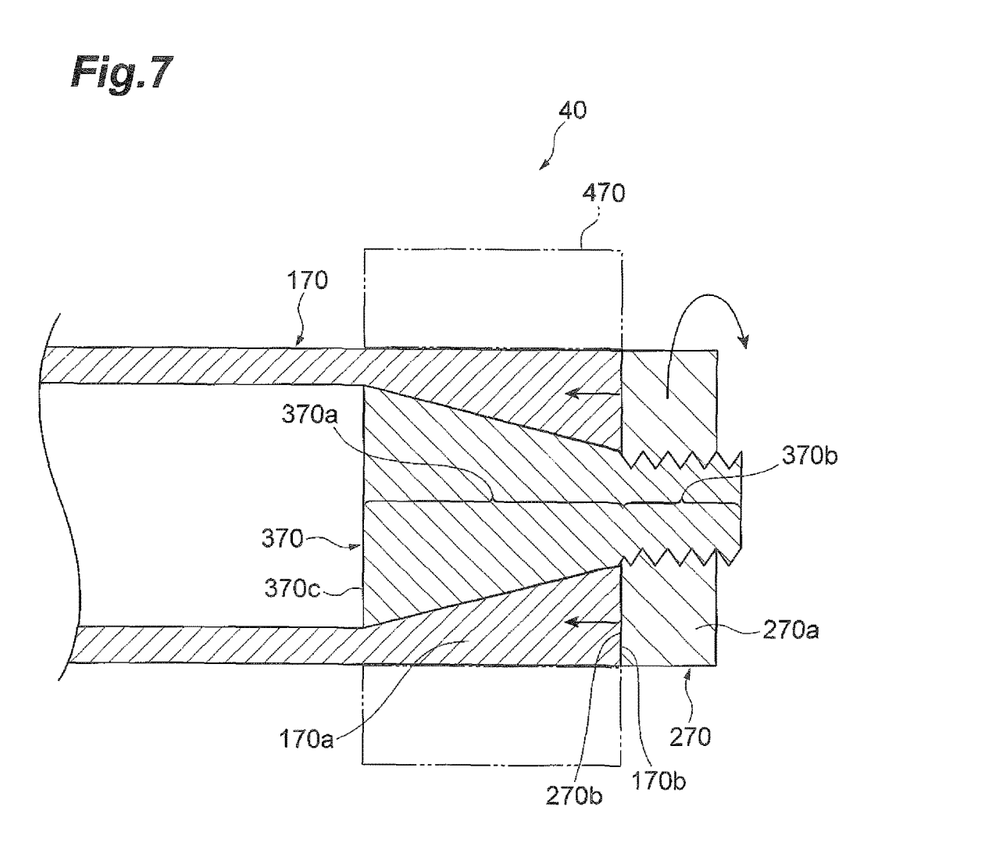
FIG. 7 is a sectional view of still another modified example of the joint structure in accordance with the embodiment of the present invention.

In the above-mentioned joint structure 10, the reversely tapered form of the end part 100a of the first member 100 increases the radial size of the outer peripheral surface (outer diameter) toward to the end face 100b of the first member 100. However, the reversely tapered form may decrease the radial size of the inner peripheral surface (inner diameter) toward to the end face of the first member. FIG. 7 illustrates a cross section of a joint structure 40 in this case. The joint structure 40 comprises a first member 170, a second member 270, and a joining member 370.

As illustrated in FIG. 7, an end part 170a of the first member 170 has a cylindrical form. Within the tubular form, the end part 170a of the first member 170 is reversely tapered in the axial direction. Specifically, the end part 170a of the first member 170 is formed to decrease the radial size of the inner peripheral surface (inner diameter) toward to an end face 170b of the first member 170. On the other hand, the radial size of the outer peripheral surface (outer diameter) of the end part 170a of the first member 170 is fixed. In this first member 170, fibers can also be oriented as illustrated in FIG. 3.

The second member 270 to be joined to the first member 170 has a junction 270a which is a part to join with the first member 170. The junction 270a has a cylindrical form with an outer diameter comparable in size to that of the end face 170b of the first member 170. The junction 270a has one end face 270b in contact with the end face 170b of the first member 170. In the joint structure 40, the axis of the end part 170a of the first member 170 and the axis of the junction 270a of the second member 270 are located on the same line.

The joining member 370 is a member which joins the first member 170 and the second member 270 to each other. The joining member 370 is disposed in close contact with and along the reversely tapered form of the inner peripheral surface of the end part 170a of the first member 170 and connected to the junction 270a of the second member 270. The joining member 370 is a circular pillared (partly conical) member. The diameter of the outer periphery (outer diameter) of the joining member 300 varies with its axial position as will be explained in the following. In the axial direction, the joining member 370 is divided into a contact part 370a which comes into close contact with the end part 170a of the first member 170 and a connection part 370b which is connected to the junction 270a of the second member 270.

The axial length of the contact part 370a is the same as that of the reversely tapered part in the end part 170a of the first member 170. The inner periphery of the contact part 370a is formed along the reversely tapered form of the end part 170a of the first member 170. That is, the outer diameter of the end part on the connection part 370b side of the contact part 370a is the same in size as the inner diameter of the end face 170b of the first member 170. The outer diameter of the end part on the other side of the contact part 370a (on the end face 370c side of the contact part 370a) is the same in size as the inner diameter of the part where the reversely tapered form of the end part 170a begins in the first member 170 (or the part not reversely tapered).

The inner peripheral surface of the connection part 370b of the joining member 370 and the outer peripheral surface of the junction 270a of the second member 270 are connected (secured) to each other by screwing. In the joint structure 40, unlike the joint structure 10, the connection part 370b of the joining member 370 is screwed into the inner peripheral surface (hole) of the junction 270a of the second member 270, so as to be secured. Therefore, the outer peripheral surface of the connection part 370b is provided with a screw groove, while the size of the diameter of the outer peripheral surface (outer diameter) corresponds to the size of the diameter of the inner peripheral surface (inner diameter) of the junction 270a of the second member 270. The inner peripheral surface of the junction 270a of the second member 270 is also provided with a screw groove. The axial length of the connection part 370b is slightly longer than that of the junction 270a.

As illustrated in FIGS. 1 and 2, the junction 270a slightly projects from the connection part 370b when the connection part 370b and junction 270a are screwed together so that the end face 270b of the junction 270a abuts against the end face 170b of the first member 170.

Such a configuration can also construct the joint structure 40 utilizing the inclination of the reversely tapered form. Specifically, the joint structure 40 using the first member 170 having an inner diameter of about 5 cm and a reverse taper angle of 3° can endure a tensile load of about 10 t. This configuration can also construct the joint structure 40 in which the end part 170a of the first member 170 has a fixed outer diameter.

When such a force as to separate the first member 170 and the second member 270 from each other is applied therebetween in the joint structure 40, a radially outward force acts on the end part 170a of the first member 170 from the contact part 370a of the joining member 370. That is, such a force as to expand the diameter of the end part 170a is exerted. Therefore, a reinforcement member 470, which is wound circumferentially about the outer peripheral surface of the end part 170a of the first member 170 so as to prevent the end part 170a of the first member 170 from expanding its diameter, may be provided in order to keep the joint strength.

INDUSTRIAL APPLICABILITY

According to one embodiment of the present invention, a fiber-reinforced plastic can appropriately be used as a member constituting constructions and the like, for example. Specifically, it can be used for (1) constructions placed on land, on the sea, in the sea, and on the bottom of the sea; (2) buildings, bridges, suspended constructions, etc.; (3) marine constructions such as floats and platforms; (4) joints for space-related devices such as solar panel frames for satellites; and (5) medical purposes such as artificial legs, for example.

REFERENCE SIGNS LIST 10, 20, 30, 40: joint structure; 100, 150, 160, 170, 180: first member; 110a: fiber; 200, 260, 270: second member; 300, 360, 370, 380: joining member; 470: reinforcement member.

The invention claimed is:

1. A joint structure between a first member, made of a fiber-reinforced plastic, having a pillared end part and a second member different from the first member;
    wherein the end part of the first member is reversely tapered in an axial direction;
    wherein the joint structure comprises a joining member disposed along a reversely tapered form of the end part of the first member;
    wherein the second member is provided in contact with an end face of the first member and connected to the joining member;
    wherein a plurality of fibers are provided within the first member such that, in a part of the first member other than the end part, the plurality of fibers substantially extend in the axial direction of the first member; and
    wherein, in the end part of the first member, the plurality of fibers are disposed to form a larger angle relative to the axial direction of the first member as they are disposed to be closer, in a radial direction, to an outer peripheral surface constituting the reversely tapered form of the end part.

2. The joint structure according to claim 1, wherein the reversely tapered form increases a radial size of the outer peripheral surface toward to the end face of the first member.

3. The joint structure according to claim 2, wherein the first member has a portion with an outer diameter not larger than the outer diameter of the reversely tapered form in a part of circumferential direction at the reversely tapered part in the outer peripheral surface, the first member and the joining member mating each other.

4. The joint structure according to claim 2, wherein the end part of the first member is tubular; and
    wherein a reinforcement member for supporting an inner peripheral surface is provided within the tubular end part of the first member.

5. The joint structure according to claim 1, wherein the end part of the first member is tubular;
   wherein the reversely tapered form reduces a radial size of an inner peripheral surface toward to the end face of the first member; and
   wherein the joining member is disposed within the tubular end part of the first member.

6. The joint structure according to claim 5, further comprising a reinforcement member wound circumferentially about the outer peripheral surface of the tubular end part of the first member.

7. The joint structure according to claim 1, wherein the angle formed by the reversely tapered end part with the axial direction of the first member is any of 3° to 5°.

8. The joint structure according to claim 1, wherein the first member is made of a carbon-fiber-reinforced plastic.

9. The joint structure according to claim 1, wherein the second member is made of a metal.

* * * * *